US008803762B2

(12) United States Patent
Lazzaro et al.

(10) Patent No.: US 8,803,762 B2
(45) Date of Patent: *Aug. 12, 2014

(54) SYSTEM FOR AUTOMATICALLY ADJUSTING ELECTRONIC DISPLAY SETTINGS

(71) Applicant: International Business Machines Corporation, Armonk, NY (US)

(72) Inventors: Luca Lazzaro, Rome (IT); Flavio Pinzauti, Rome (IT); Riccardo Pizzutilo, Rome (IT); Benedetta Guidi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,066

(22) Filed: Jun. 3, 2013

(65) Prior Publication Data
US 2013/0271478 A1 Oct. 17, 2013

Related U.S. Application Data

(63) Continuation of application No. 13/324,362, filed on Dec. 13, 2011.

(51) Int. Cl.
G09G 5/00 (2006.01)

(52) U.S. Cl.
USPC .............................. 345/1.1; 345/1.2; 345/2.2

(58) Field of Classification Search
USPC ............... 345/1.1, 1.2, 1.3, 2.1, 2.2, 2.3, 5
See application file for complete search history.

(56) References Cited

U.S. PATENT DOCUMENTS

| 5,786,801 | A  | * | 7/1998  | Ichise ............................ 345/102 |
| 5,805,117 | A  | * | 9/1998  | Mazurek et al. ............... 345/1.3 |
| 6,411,306 | B1 |   | 6/2002  | Miller |
| 6,611,241 | B1 |   | 8/2003  | Firester et al. |
| 6,804,406 | B1 |   | 10/2004 | Chen |
| 7,068,293 | B2 |   | 6/2006  | Wang |

(Continued)

FOREIGN PATENT DOCUMENTS

JP 2005250113 A 9/2005

OTHER PUBLICATIONS

Notice of Allowance in related U.S. Appl. No. 13/421,193, mailed on Apr. 29, 2013; 13 pages.

(Continued)

Primary Examiner — Jason Mandeville
(74) Attorney, Agent, or Firm — Schmeiser, Olsen & Watts LLP

(57) ABSTRACT

Described are systems for automatically adjusting a set of display settings. At least one image sample is displayed at a first display according to display settings of the first display. Electromagnetic radiation generated from the first display is collected. The electromagnetic radiation includes first image data related to the at least one image sample at the first display. An image sample is displayed at a second display according to display settings of the second display. Electromagnetic radiation generated from the second display is collected. The electromagnetic radiation includes second image data related to the image sample at the second display. A margin of error is determined between the first image data and the second image data. The display settings of the second display are adjusted to reduce the margin of error.

7 Claims, 5 Drawing Sheets

(56) References Cited

U.S. PATENT DOCUMENTS

| | | |
|---|---|---|
| 7,113,181 B2 | 9/2006 | Tey |
| 7,134,091 B2 | 11/2006 | Dresevic |
| 7,158,173 B2 | 1/2007 | Lee |
| 7,253,814 B2 | 8/2007 | Kim et al. |
| 7,408,557 B2 | 8/2008 | Ko et al. |
| 7,589,695 B2 | 9/2009 | Tanaka |
| 7,592,970 B2 | 9/2009 | Matthies et al. |
| 8,388,140 B2 * | 3/2013 | Sato et al. .................. 353/31 |
| 2007/0120763 A1 * | 5/2007 | De Paepe et al. .............. 345/1.3 |
| 2008/0077344 A1 | 3/2008 | Gall et al. |
| 2011/0095875 A1 | 4/2011 | Thyssen |
| 2011/0095965 A1 | 4/2011 | Yoneoka et al. |
| 2011/0298763 A1 | 12/2011 | Mahajan |
| 2013/0147684 A1 * | 6/2013 | Lazzaro et al. ................. 345/1.1 |

OTHER PUBLICATIONS

Notice of Allowance in related U.S. Appl. No. 13/324,362, mailed on Apr. 29, 2013; 13 pages.

Search and Examination Report in related UK patent application No. GB1221176.9, mailed on May 29, 2013; 5 pages.

Non-Final Office Action in related U.S. Appl. No. 13/908,093, mailed on Nov. 19, 2014; 19 pages.

* cited by examiner

SYSTEM FOR AUTOMATICALLY ADJUSTING ELECTRONIC DISPLAY SETTINGS

RELATED APPLICATIONS

This application is a continuation application claiming the benefit of the filing date of U.S. patent application Ser. No. 13/324,362, filed Dec. 13, 2011, entitled "System and Method for Automatically Adjusting Electronic Display Settings," the contents of which are incorporated by reference herein in their entirety.

FIELD OF THE INVENTION

The present invention relates generally to image displays, and more specifically, to a system and method for replicating image display settings customized according to user perceptions with respect to viewing a display and for modifying display settings of other image devices according to the replicated image display settings.

BACKGROUND

Many electronic devices include computer monitors, touchscreens, viewers, high definition television (HDTV) screens, liquid crystal displays (LCD) and the like for displaying information processed by the device, for example, pictures, videos, web pages, and other graphic-related data. Electronic device users often personalize the settings of the display according to personal preferences or requirements. For example, one user may adjust a display's settings to accommodate an eye-related deficiency such as far-sighted vision, while another user may require a display to be adjusted to accommodate issues related to photosensitivity.

Modern electronic device users also tend to have access to different displays, for example, a television display, a touchscreen, and a computer monitor. Each display includes screen settings, such as brightness, contrast, and so on, which can be adjusted according to the user's personal requirements or preferences. Differences in monitor size, brands, materials used, and so on can result in the same image being displayed differently, even if the settings are the same at each display. A user's perception of a displayed image may not align with the actual display settings, requiring manual adjustments to the settings to achieve a desired displayed image.

BRIEF SUMMARY

In one aspect, a display setting adjustment system is provided comprising an image data processing module that receives first image data determined from electromagnetic radiation captured by a first photosensitive device from a first display, the first image data related to at least one image sample at the first display, and that receives second image data determined from electromagnetic radiation captured by a second photosensitive device from a second display, the second image data related to at least one image sample at the second display; an error determining module that determines a margin of error between the first image data and the second image data; and a display modification module that adjusts the display settings of the second display to reduce the margin of error.

In another aspect, a computer program product is provided for automatically adjusting a set of display settings. The computer program product comprises a computer readable storage medium having computer readable program code embodied therewith. The computer readable program code comprises computer readable program code configured to display at least one image sample at a first display according to display settings of the first display; computer readable program code configured to collect electromagnetic radiation generated from the first display, the electromagnetic radiation including first image data related to the at least one image sample at the first display; computer readable program code configured to display an image sample at a second display according to display settings of the second display; computer readable program code configured to collect electromagnetic radiation generated from the second display, the electromagnetic radiation including second image data related to the image sample at the second display; computer readable program code configured to determine a margin of error between the first image data and the second image data; and computer readable program code configured to adjust the display settings of the second display to reduce the margin of error.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

Figure 1:
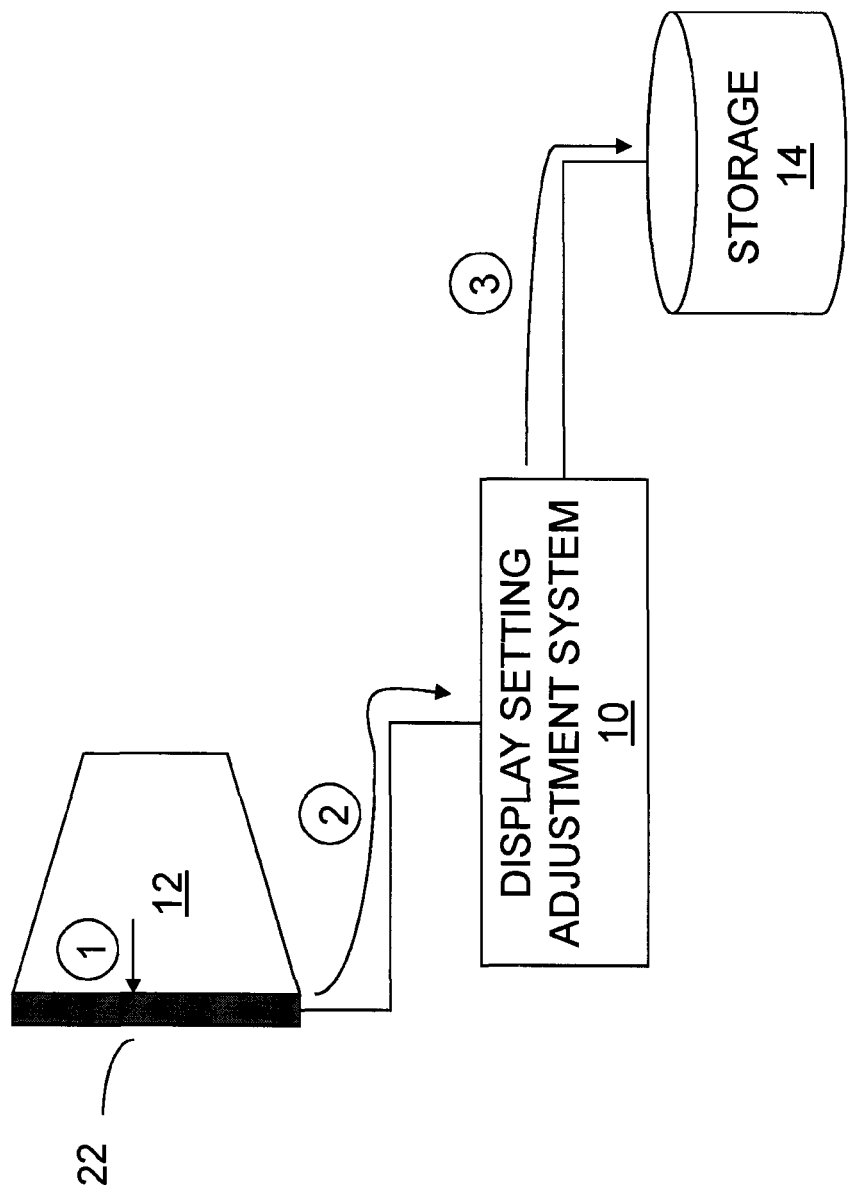
FIG. 1 is a block diagram of a display setting adjustment system in communication with a reference electronic device display, according to an embodiment of the present inventive concepts.

FIG. 1 is a block diagram of a display setting adjustment system 10 in communication with an electronic device display 12, according to an aspect of the present inventive concepts.

The display 12, also referred to as a first display, a source display, or a reference display, can include a monitor, a touchscreen, a camera window, or other electronic device having a screen for displaying text, graphics, or other electronic data. A photosensitive panel 22 can be positioned over the display 12 for capturing image light properties, as shown at flow arrow (1). Although a photosensitive panel 22 is shown, any photosensitive device can equally apply, including a camera or other device having photosensitive elements, sensors, and so on, for capturing optical information from a display and recording it on a film, storage device, and the like. The photosensitive panel 22 can include light sensing elements that are integrated with the display screen, for example, with plasma displays, touchscreens, and related displays.

The display setting adjustment system 10 includes an image data processing module that receives image data determined from the light properties captured by the photosensitive panel 22, as shown at flow arrow (2) of FIG. 1. The image data can include characteristics of one or more image samples displayed at the first display captured by the photosensitive panel 22.

The image data related to each image presented at the display 12 and captured at the photosensitive panel 22 can be output to the display setting adjustment system 10. The image data can be stored as a file or related format at a storage device 14 such as a computer memory or other computer-readable medium as shown at flow arrow (3). The recorded data can be used to modify the display settings at one or more other electronic device displays.

The display setting adjustment system 10, the display 12, and the storage device 14 can communicate with each other via a network (not shown). The network can be a local area network (LAN), a wide area network (WAN), or other communications network for transmitting electronic data.

Figure 2:
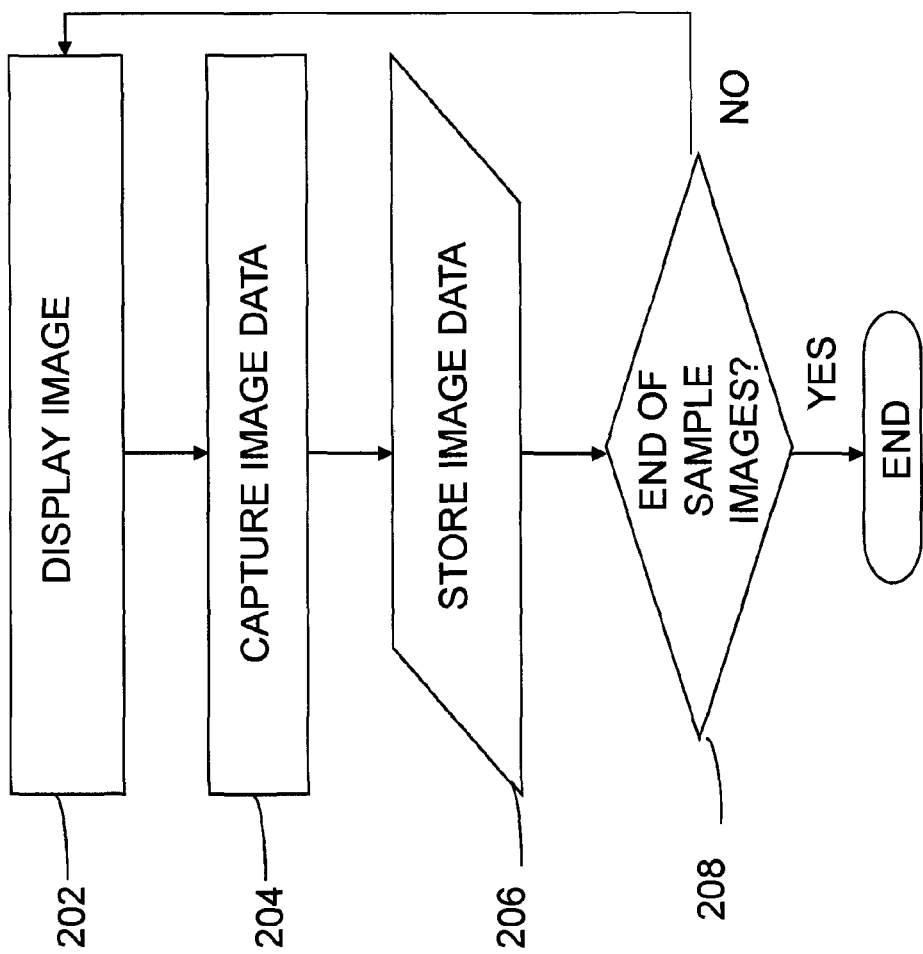
FIG. 2 is a method for acquiring display setting data, according to an embodiment of the present inventive concepts.

FIG. 2 is a method 200 for acquiring display setting data, in accordance with an embodiment. In describing the method 700, reference is also made to FIG. 1. Some or all of the method 200 can be performed at the display setting adjustment system 10 of FIG. 1. The method 200 can be governed by instructions that are stored in a memory of the display setting adjustment system 10, the storage device 14, or a combination thereof, and executed by a processor of the display setting adjustment system 10.

Figure 3:
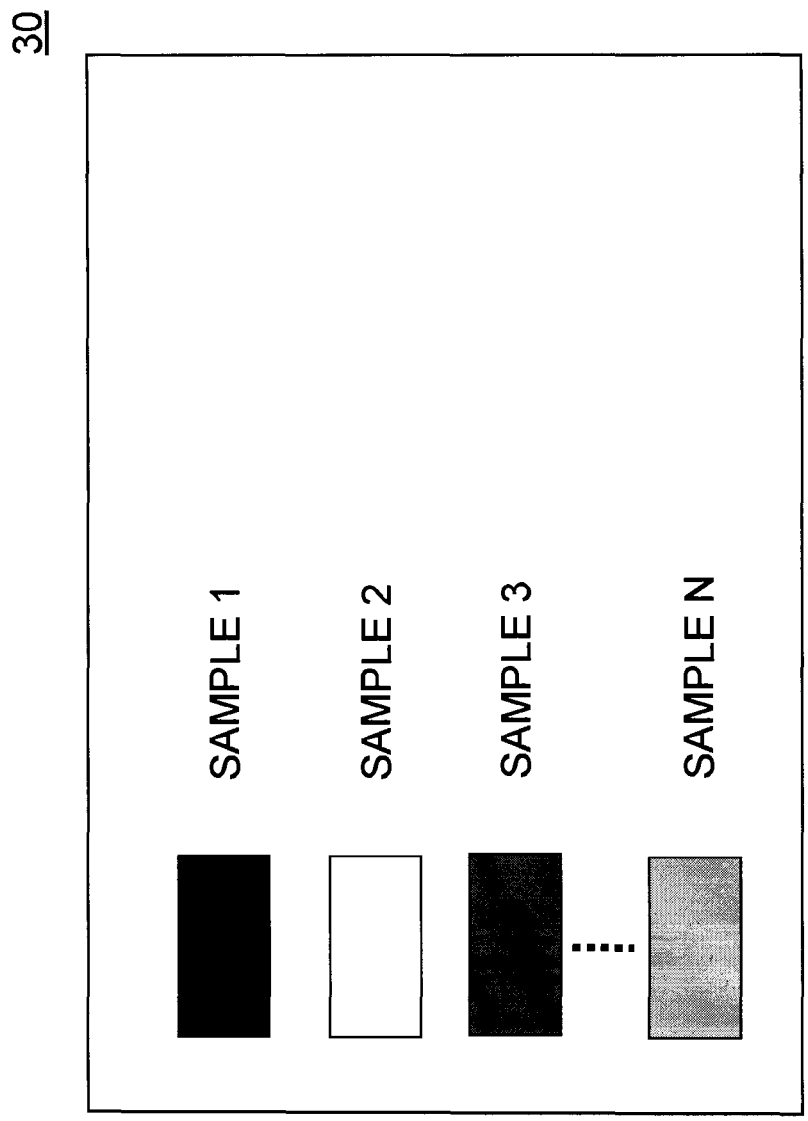
FIG. 3 is a diagram illustrating a set of sample images presented at a display, according to an embodiment of the present inventive concepts.

At operation 202, an image, for example, Sample 1 shown in FIG. 3, is displayed at a first display screen 12. The display screen 12 can be a monitor, a touchscreen, or other electronic device display. The image is displayed according to particular display settings associated with the first display screen, for example, brightness, contrast, color temperature, and so on.

At operation 204, data related to the displayed image can be captured, for example, using a photosensitive panel 22 or other photosensitive device positioned at the display screen 12 over the displayed image. The photosensitive panel 22 can include light sensing elements that are integrated with the display screen 12, for example, with plasma displays, touchscreens, and related displays. The photosensitive panel 22 can capture light or other radiation generated from the displayed image, and convert the light into data, which can be stored. In doing so, the captured image data can include optical properties of the displayed image, for example, properties related to screen brightness, contrast, color temperature, and so on.

At operation 206, the image data is stored in a file, for example, as source code derived from the light captured by the photosensitive panel 22. The stored data can include all electromagnetic radiation data emitted from the display screen 12 for each displayed image.

At decision diamond 208, a determination is made whether there are additional sample images, for example, Sample 2, Sample 3, Sample 4 shown in FIG. 3. If the determination is established at decision diamond 208 that another image is displayed, then operation 202 is performed on the additional images. Otherwise, the method 200 is completed.

Figure 4:
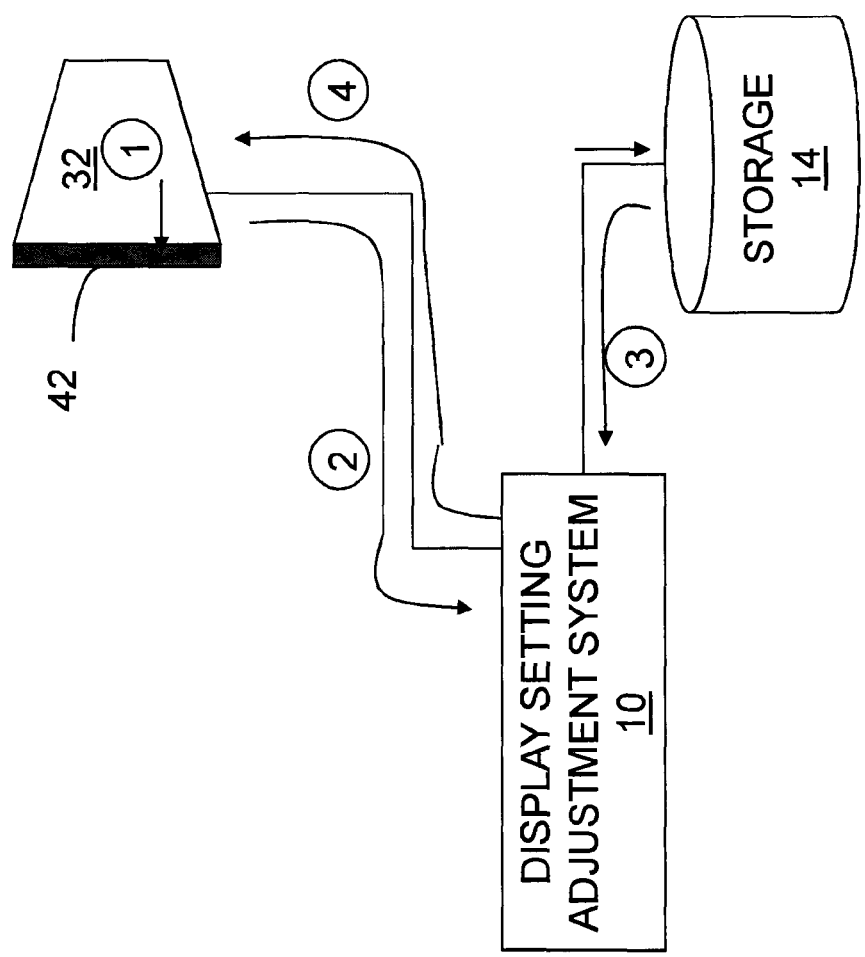
FIG. 4 is a block diagram of the display setting adjustment system of FIG. 1 in communication with a target electronic device display, according to an embodiment of the present inventive concepts.

FIG. 4 is a block diagram of the display setting adjustment system 10 of FIG. 1 in communication with a target electronic device display 32, according to an aspect of the present inventive concepts. The flow arrows described in FIG. 1 can be applied before the flow arrows of FIG. 4, and will therefore not be repeated for the sake of brevity. The target display 32, like the display setting adjustment system 10, the source display 12, and the storage device 14, can be connected to a network (not shown), for example, a local area network (LAN), a wide area network (WAN), or other communications network for transmitting electronic data.

The target display 32, also referred to as a second display 32, can be a monitor, touchscreen, a camera window, or other electronic device having a screen for displaying text, graphics, or other electronic data. A photosensitive panel 42 can be positioned over the target display 32 for capturing electromagnetic radiation generated from the target display 32, as shown at flow arrow (1), in a manner similar to that described with reference to flow arrow (1) of FIG. 1. Details regarding the photosensitive panel 42 are therefore omitted for the sake of brevity. The sample image presented at the target display 32 is the same or similar to the sample image displayed at the display 12, for example, shown in FIG. 3.

The sample image data captured by the photosensitive panel 42 is output to the display setting adjustment system 10 as shown at flow arrow (2). The display setting adjustment system 10 also receives the stored sample image data captured by the photosensitive panel 22 from the storage device 14, as shown at flow arrow (3).

The display setting adjustment system 10 includes an error determining module that determines a margin of error between the image data collected from the display screens 12 and 32, respectively, and includes a display modification module that reduces the margin of error between the image data corresponding to the image sample generated at the first display 12 and the image data corresponding to the image sample generated at the second display 32 by automatically changing the display settings of the target display 32. The target display settings can be adjusted according to an optimal match between the input data and the new data coming from the panel over the target display, shown at flow arrow (4).

Figure 5:
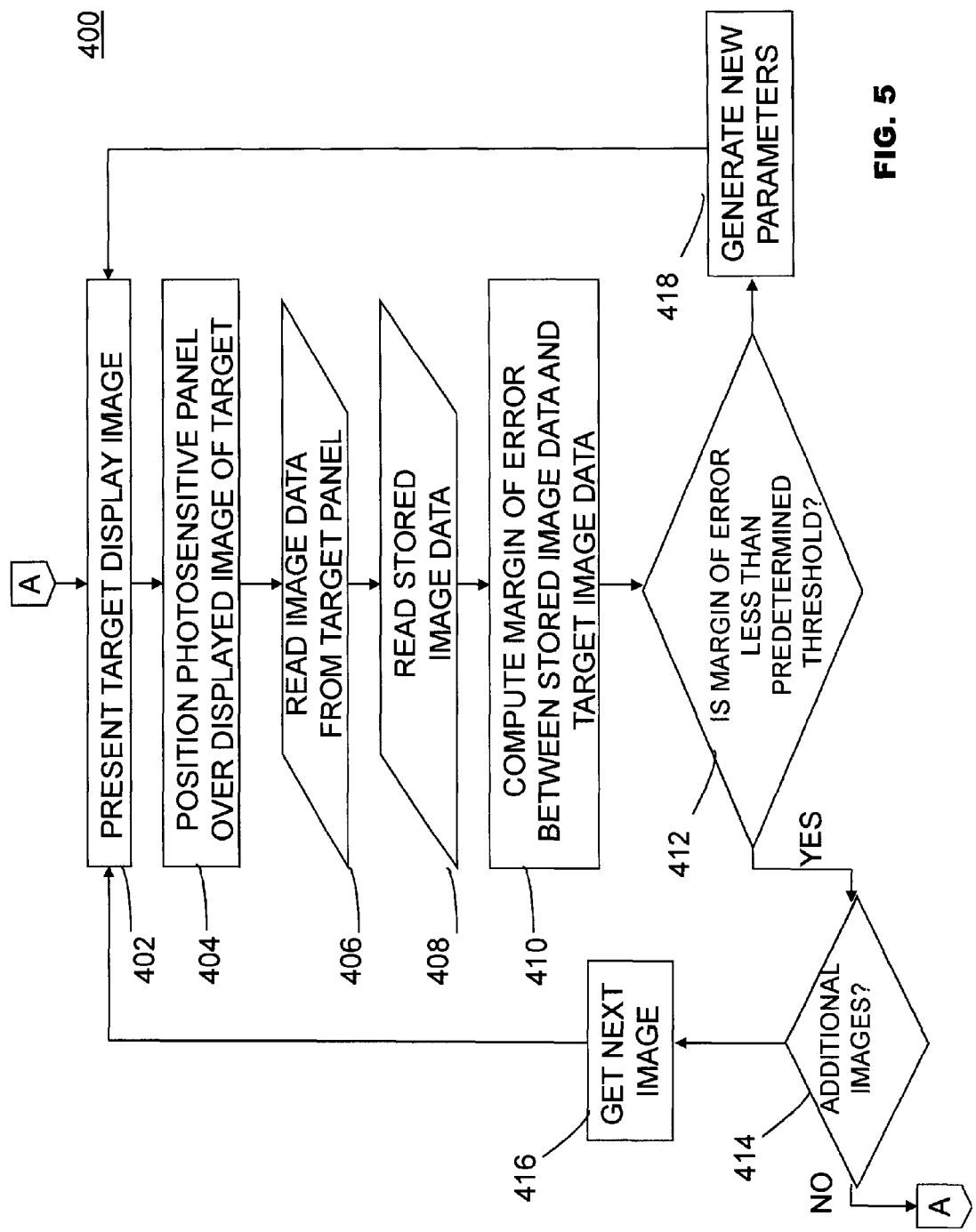
FIG. 5 is a method for adjusting display settings of a target display device, according to an embodiment of the present inventive concepts.

FIG. 5 is a method 400 for adjusting display settings of a target display device, in accordance with an embodiment. Some or all of the method 400 can be performed at the display setting adjustment system 10 of FIGS. 1 and 4. The method 400 can be governed by instructions that are stored in a memory device of the display setting adjustment system 10, the storage device 14, or a combination thereof, and that are executed by a processor of the display setting adjustment system 10.

At operation 402, an image, for example, a sample image shown in FIG. 3, is displayed at a target display screen, for example, a monitor, touchscreen, or other electronic device display. The image is preferably displayed according to particular display settings associated with the first display screen. The image is displayed according to display settings such as screen resolution, DPI, color temperature, and so on, which are customized according to a user's personal preference. The sample images shown on the display 12 can likewise be presented at one or more other target displays, and a photosensitive panel can be placed over the target display to retrieve image data used to create a desirable match according to a user's perception of the displayed image.

At operation 404, a photosensitive panel is positioned at a target display screen. The photosensitive panel can include light sensing elements that are integrated with the display screen, for example, with plasma displays, touchscreens, and related displays.

At operation 406, image data is read from the photosensitive panel 42 of the target display 32. In particular, the photosensitive panel captures light or other radiation generated from the displayed image, which includes the image data.

At operation 408, stored image data corresponding to the image displayed at the source display 12 is read from the storage device 14. The stored image data can be acquired according to the method 200 described herein.

At operation 410, a margin of error is computed between the stored image data and the target image data. This can be achieved by calculating the distance between the stored image data read according to operation 408 and the image data read according to operation 406. The distance can be a monotone increasing function greater than or equal to 0, and can be determined according to mathematical techniques known to those of ordinary skill in the art used to determine a distance between two-dimensional objects such as images.

At decision diamond 412, the computed margin of error is compared to a predetermined threshold. If a determination is made at decision diamond 412 that the margin of error is less than the predetermined threshold, then the margin of error is determined to be acceptable. The threshold can be determined according to well-known techniques, depending on whether the user requires an accurate calibration, a required time period to perform the calibration, and so on.

If a determination is made at decision diamond 412 that the margin of error is less than the predetermined threshold, then the margin of error is deemed unacceptable, and at operation block 418, a new set of parameters is calculated, which are used to adjust the settings of the target display. The calculation of the new set of parameters therefore takes into account the feedback loop minimizing the margin of error computed between the stored image data and the target image data. Accordingly, the method 400 proceeds to operation 402, where the image is displayed at the target display according to the new parameters. A feedback loop permits the target display image to be automatically adjusted to be the same as or similar to the source display image having a reduced or minimized error between the two images. The operations in the method 400 can be performed until the margin of error is reduced to a 0 value. Alternatively, the display setting adjustment system can include a timer that is configured with a predetermined time during which the operations are to be completed. At the end of the predetermined time, the target display settings can be configured in accordance with the parameters generated in view of the margin of error.

Parameter values applied to the target display for adjusting the display settings to reduce a margin of error between two images can be determined as follows.

S (S1, S2, S3, . . . ) is a set of sampled images saved as source. X1, X2, . . . , Xn represents a set of monitor parameters to be adjusted at the target display. C(a, b) is the function of correlation between an image displayed at the source display, referred to as image A, and an image displayed at the target display, referred to as image B. Image A can refer to a stored image corresponding to the source display 12 described at operation 408. Image B can refer to the image displayed at the target display 32 described at operation 406. Digital image correlation (DIC) or related correlation techniques can be applied to determine changes between images A and B.

For each element (Si), where i is an integer, in the set of sampled images, B(X1, X2, . . . , Xn) can be calculated as the image projected by the target display 32. Accordingly, target display image B is calculated as being the image projected by the target display 32 using X1, X2, . . . , Xn parameter values. Each parameter value can correspond to a characteristic of the sample image as displayed, for example, color temperature, brightness, and so on.

The function C(X1, X2, . . . Xn)=C(Si, B(X1, X2, . . . , Xn) is calculated according to a correlation technique such as DIC.

The parameters (X1, X2, . . . , Xn) can be varied. In doing so, a maximum value of the function C(X1, X2, . . . Xn)=C(Si, B(X1, X2, . . . , Xn), referred to as Mi=(M×1, M×2, . . . , M×n), can be calculated. M1, M2, . . . , Mn can be obtained as the set of vectors representing a maximum correlation value for each image.

A final vector V(V1, V2, . . . , Vn) can be calculated as the standard deviation of the set of vectors (M1, M2, . . . , Mn). The components of the final vector V can be the parameters used to configure the target display settings. For example, any and all relevant parameters corresponding to color temperature, brightness, and so on can be obtained and can contribute to the final vector V.

Accordingly, the systems and methods described above are performed automatically and at a high degree of precision as distinguished from the conventional approach of manually adjusting display settings. Further, the system and method for automatically adjusting display settings can be based on a user's perception of a displayed image to overcome differences in display characteristics resulting from different brands, lighting characteristics, and so on. Instead of exporting display settings based on absolute parameters, the user's perception of an image can be obtained at the reference, and applied to other displays using the recorded "perceived image" as a reference, which takes into consideration both environmental factors and subjective perception. Accordingly, a displayed graphic, icon, digital photograph, background field, and the like on one computer display can be displayed to a user by automatically adjusting the display parameters according to what the user sees with respect to color, etc. on another display.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A display setting adjustment system, comprising:
   an image data processor of a hardware computer that receives first image data determined from electromagnetic radiation captured by a first photosensitive device from a first display, the first image data related to at least one image sample at the first display, and that receives second image data determined from electromagnetic radiation captured by a second photosensitive device from a second display, the second image data related to at least one image sample at the second display, wherein a first image corresponding to the first image data is viewable by a viewer at a screen of the first display and a second image corresponding to the second image data is viewable by the viewer at a screen of the second display that is different than the screen of the first display; and
   an error determining module of a computer processor of a hardware computer that determines a margin of error between the first image data and the second image data, wherein the error determining module determines a function of correlation between the first image data and the second image data, determines a maximum of the function of correlation by varying first parameter values corresponding to the display settings of the second display, obtains a set of vectors representing a maximum correlation value for each of the at least one image sample at the first display and the at least one image sample at the second display, and determines a final vector as a standard deviation of the set of vectors.

2. The display setting adjustment system of claim 1, further comprising a display modification module of a computer processor that adjusts the display settings of the second display to reduce the margin of error.

3. A computer program product for automatically adjusting a set of display settings, comprising:
   a non-transitory computer readable storage medium having computer readable program code embodied therewith, the computer readable program code comprising:
   computer readable program code configured to display at least one image sample at a first display according to display settings of the first display;
   computer readable program code configured to collect electromagnetic radiation generated from the first display, the electromagnetic radiation including first image data related to the at least one image sample at the first display;

computer readable program code configured to display an image sample at a second display according to display settings of the second display;

computer readable program code configured to collect electromagnetic radiation generated from the second display, the electromagnetic radiation including second image data related to the image sample at the second display, wherein a first image corresponding to the first image data is viewable by a viewer at a screen of the first display and a second image corresponding to the second image data is viewable by the viewer at a screen of the second display that is different than the screen of the first display;

computer readable program code configured to determine a margin of error between the first image data and the second image data;

computer readable program code configured to determine a function of correlation between the first image data and the second image data;

computer readable program code configured to determine a maximum of the function of correlation by varying first parameter values corresponding to the display settings of the second display;

computer readable program code configured to obtain a set of vectors representing a maximum correlation value for each of the at least one image sample at the first display and the at least one image sample at the second display; and computer readable program code configured to determine a final vector as a standard deviation of the set of vectors.

4. The display setting adjustment system of claim 2, wherein the display modification module adjusts the display settings to reduce the margin of error to be less than or equal to a predetermined threshold, or to a 0 value.

5. The display setting adjustment system of claim 1, wherein the components of the final vector include second parameter values corresponding to the display settings of the second display.

6. The computer program product of claim 3, further comprising computer readable program code configured to adjust the display settings of the second display to reduce the margin of error.

7. The computer program product of claim 3, wherein the components of the final vector include second parameter values corresponding to the display settings of the second display.

* * * * *